United States Patent
Chiu et al.

(10) Patent No.: US 10,087,005 B1
(45) Date of Patent: Oct. 2, 2018

(54) SHUNTING TRANSMISSION DEVICE AND SHUNTING TRANSMISSION METHOD USING THE SAME

(71) Applicant: FOXSEMICON INTEGRATED TECHNOLOGY, INC., Miao-Li Hsien (TW)

(72) Inventors: Yi-Chun Chiu, New Taipei (TW); Chun-Kai Huang, New Taipei (TW); Chih-Cheng Lu, Miaoli Hsien (TW); Chun-Chung Chen, Miaoli Hsien (TW)

(73) Assignee: FOXSEMICON INTEGRATED TECHNOLOGY, INC., Miao-Li Hsien (TW)

( * ) Notice: Subject to any disclaimer, the term of this patent is extended or adjusted under 35 U.S.C. 154(b) by 0 days.

(21) Appl. No.: 15/832,561

(22) Filed: Dec. 5, 2017

(30) Foreign Application Priority Data

Jul. 31, 2017  (CN) .......................... 2017 1 0640902

(51) Int. Cl.
*B65G 39/10* (2006.01)
*B65G 13/04* (2006.01)
*B65G 39/04* (2006.01)

(52) U.S. Cl.
CPC .............. *B65G 13/04* (2013.01); *B65G 39/04* (2013.01); *B65G 39/10* (2013.01); *B65G 2201/02* (2013.01)

(58) Field of Classification Search
CPC ........ B65G 39/10; B65G 13/02; B65G 39/04; B65G 39/025; B65G 2207/34
USPC .... 198/786, 787, 370.09, 371.3; 193/35 MD
See application file for complete search history.

(56) References Cited

U.S. PATENT DOCUMENTS

| | | | | |
|---|---|---|---|---|
| 3,874,491 A * | 4/1975 | Faure | ...................... | B65G 13/10 193/35 MD |
| 4,907,692 A | 3/1990 | Sogge | | |
| 4,981,209 A * | 1/1991 | Sogge | ................... | B65G 13/10 193/35 MD |
| 5,064,045 A * | 11/1991 | Leon | ...................... | B65G 39/04 193/35 MD |
| 6,340,083 B1 * | 1/2002 | Zhou | ....................... | B64D 9/00 193/35 MD |
| 6,409,010 B1 | 6/2002 | Leon | | |
| 6,571,937 B1 * | 6/2003 | Costanzo | ............... | B65G 13/10 198/370.03 |

(Continued)

*Primary Examiner* — James R Bidwell
(74) *Attorney, Agent, or Firm* — ScienBiziP, P.C.

(57) ABSTRACT

A shunting device used to transport workpieces comprises a plurality of rotating shafts parallel to one another and arranged in arrays, a plurality of first omnidirectional wheels, and a plurality of second omnidirectional wheels. The first omnidirectional wheels and the second omnidirectional wheels are each wrapped around a corresponding one of the rotating shafts in a matrix. The first omnidirectional wheels and the second omnidirectional wheels are alternatively arranged along the corresponding one of the plurality of rotating shafts and a second direction perpendicular to the plurality of rotating shafts. A plurality of first driven rollers of the first omnidirectional wheels and a plurality of second driven rollers of the second omnidirectional wheels are mirror-symmetrical along at least one of a third direction parallel to the plurality of rotating shafts and the second direction.

4 Claims, 7 Drawing Sheets

(56) References Cited

U.S. PATENT DOCUMENTS

| | | | | |
|---|---|---|---|---|
| 6,871,823 B2 * | 3/2005 | Roberts | ............... | B64C 1/20 |
| | | | | 198/370.09 |
| 7,431,148 B2 * | 10/2008 | Li | ............. | B60B 19/003 |
| | | | | 193/35 MD |
| 8,567,587 B2 * | 10/2013 | Faist | ............... | B65G 1/0478 |
| | | | | 198/370.09 |

* cited by examiner

SHUNTING TRANSMISSION DEVICE AND SHUNTING TRANSMISSION METHOD USING THE SAME

FIELD

The subject matter herein generally relates to a shunting transmission device and a shunting transmission method using the shunting transmission device.

BACKGROUND

A transmission device is usually used to transport a plurality of products to desired areas. When the products need to be shunt toward different directions or different areas, a moving device is needed to move the products. In general there are two ways to shunt the products. One way is that forward transmission device stop then switch to lateral transmission device. This way slow down the transportation speed. Another way is that make double layer transmission device, bottom one for forward transmission and top one for lateral transmission. This way increase the transmission complication and cost.

BRIEF DESCRIPTION OF THE DRAWINGS

Implementations of the present disclosure will now be described, by way of example only, with reference to the attached figures.

DETAILED DESCRIPTION

Figure 1:
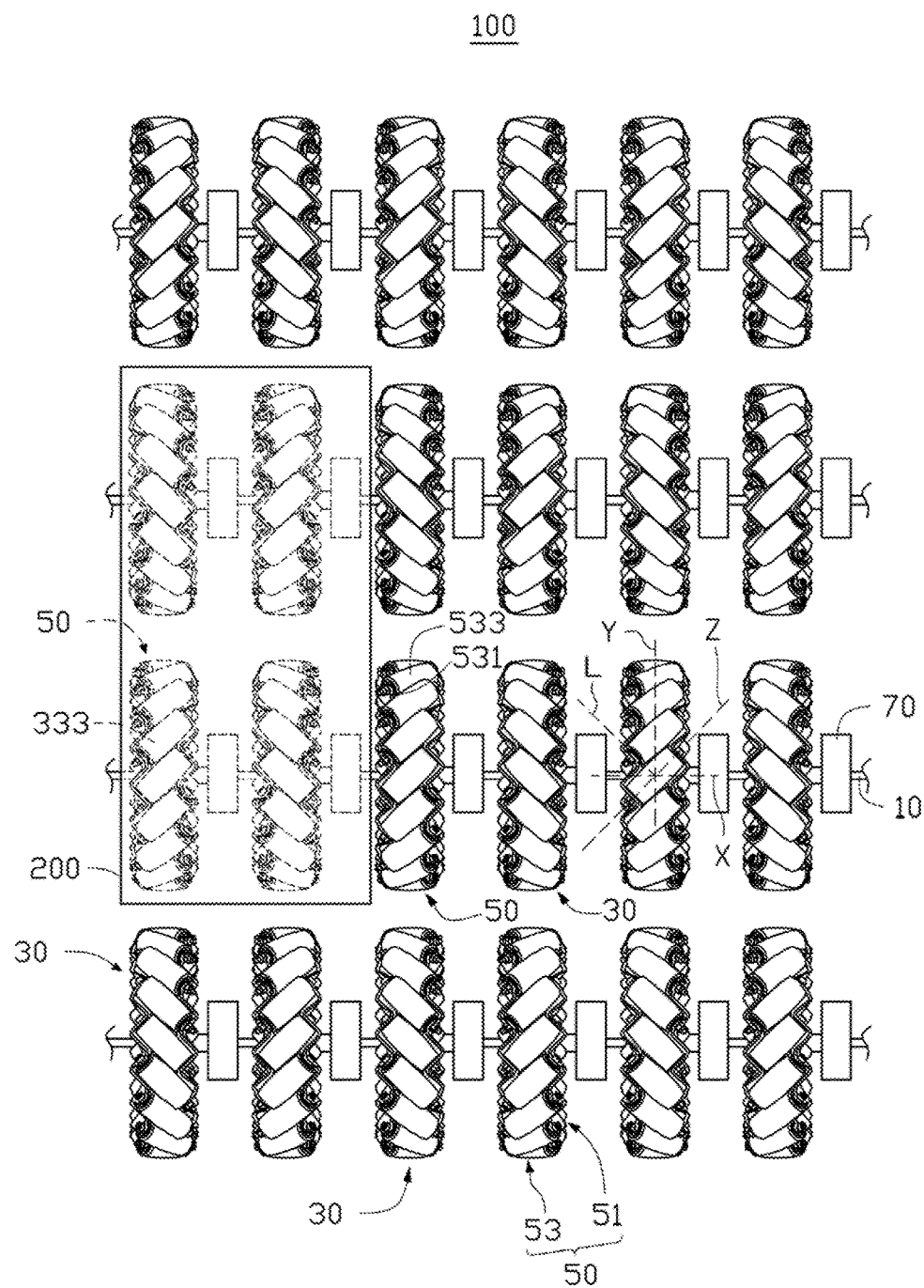
FIG. 1 is a diagram of an exemplary embodiment of a shunting transmission device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "comprising" when utilized, means "including, but not necessarily limited to"; it specifically indicates open-ended inclusion or membership in the so-described combination, group, series and the like.

FIG. 1 illustrates an exemplary embodiment of a shunting transmission device 100 used to transport at least one workpiece 200. The shunting transmission device 100 comprises a plurality of rotating shafts 10 parallel to one another and arranged in arrays, a plurality of first omnidirectional wheels 30, and a plurality of second omnidirectional wheels 50. The first omnidirectional wheels 30 and the second omnidirectional wheels 50 are arranged in a matrix. The first omnidirectional wheels 30 and the second omnidirectional wheels 50 are wrapped around their corresponding rotating shafts 10, and can rotate with respect to their corresponding rotating shafts 10. The first omnidirectional wheels 30 and the second omnidirectional wheels 50 are alternatively arranged along at least one of a third direction X along or parallel to which the rotating shafts 10 extend and a second direction Y perpendicular to the first direction X. Each workpiece 200 is supported by at least two first omnidirectional wheels 30 and at least two second omnidirectional wheels 50. The number of the first omnidirectional wheels 30 for supporting the workpiece 200 is equal to the number of the second omnidirectional wheels 50 for supporting the workpiece 200.

Figure 2:
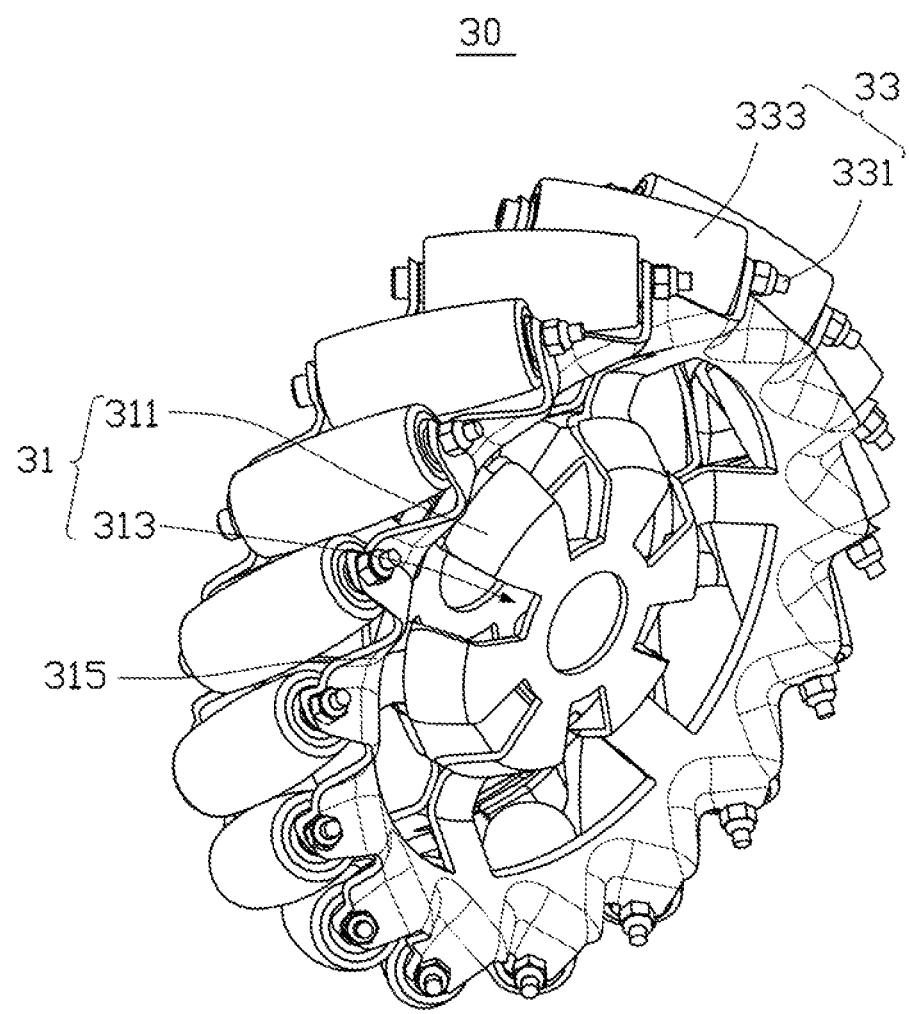
FIG. 2 is a diagram of a first omnidirectional wheel used in the shunting transmission device of FIG. 1.

Referring to FIG. 2, each first omnidirectional wheel 30 comprises a first hub 31 and a plurality of first driven rollers 33 installed on a periphery of the first hub 31. The first hub 31 is wrapped around the rotating shaft 10. In at least one exemplary embodiment, the first hub 31 comprises a first support hub 311 and a second support hub 313. The first support hub 311 and the second support hub 313 are alternatively arranged along the third direction X. The first support hub 311 is symmetrical with the second support hub 313.

A wavy fixing portion 315 is formed along an outer circumference of each of the first support hub 311 and the second support hub 313.

Each first driven roller 33 comprises a connecting shaft 331 and a roller body 333 wrapped around the connecting shaft 331. The roller body 333 can rotate with respect to the connecting shaft 331. The connecting shaft 331 is fixed between the wavy fixing portion 315 of the first support hub 311 and the wavy fixing portion 315 of the second support hub 313. An angle between a first direction Z along which each connecting shaft 331 extends and the third direction X is less than 90 degrees, such as 30 degrees, 45 degrees, and 60 degrees. In at least one exemplary embodiment, the angle is 45 degrees.

The second omnidirectional wheel 50 comprises a second hub 51 and a plurality of second driven rollers 53. A structure of the second hub 51 and a structure of the first hub 31 may be the same. The second driven rollers 53 and the first driven rollers 33 are mirror-symmetrical along at least one of the third direction X and the second direction Y. The second driven rollers 53 comprises a connecting shaft 531 and a roller body 533 wrapped around the connecting shaft 531.

The shunting transmission device 100 may further comprise a controller (not shown) and a plurality of drivers 70 electrically connected to the controller. In at least one exemplary embodiment, each driver 70 is connected to one first omnidirectional wheel 30 or one second omnidirectional wheel 50, to drive the first omnidirectional wheel 30 or the second omnidirectional wheel 50 to rotate with respect to the rotating shaft 10.

In this exemplary embodiment, the first omnidirectional wheels 30 and the second omnidirectional wheels 50 are alternatively arranged along both of the third direction X and the second direction Y (as shown in FIG. 1).

Figure 3:
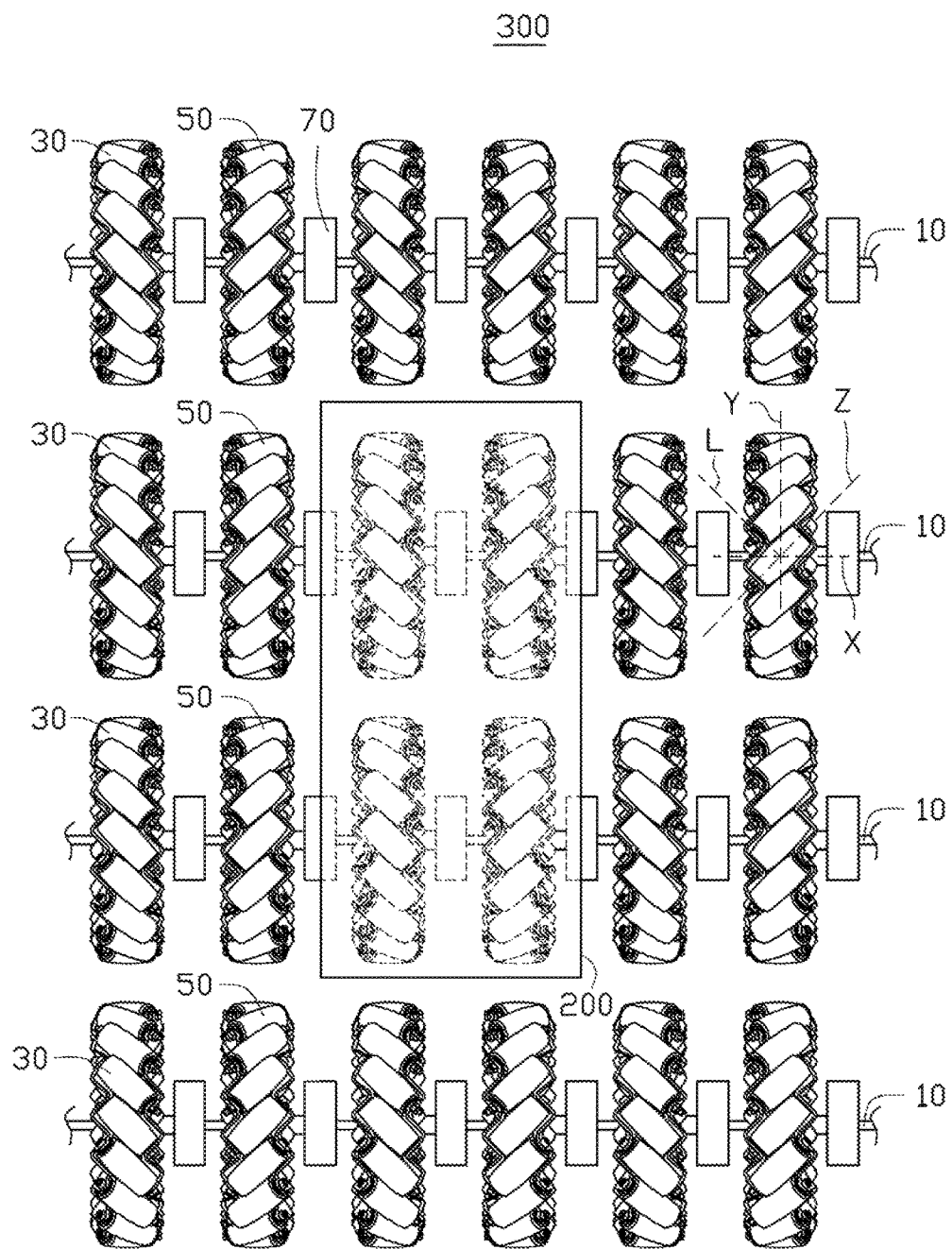
FIG. 3 is a diagram of a second exemplary embodiment of a shunting transmission device.

In a second exemplary embodiment, referring to FIG. 3, the first omnidirectional wheels 30 and the second omnidirectional wheels 50 are alternatively arranged only along the third direction X. The first omnidirectional wheels 30 and the second omnidirectional wheels 50 are arranged along any two rotating shafts 10 in a same order.

Figure 4:
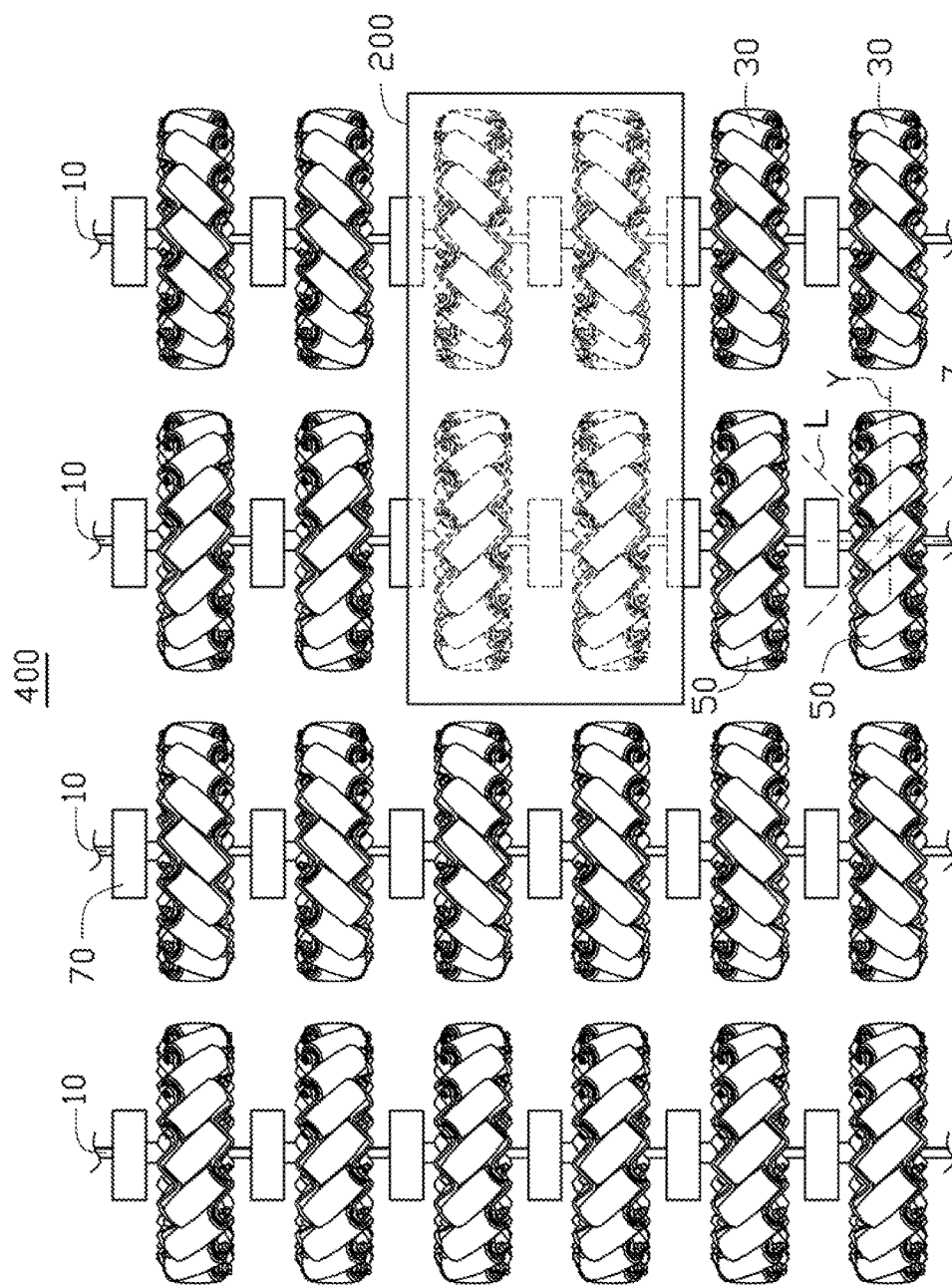
FIG. 4 is a diagram of a third exemplary embodiment of a shunting transmission device.

In a third exemplary embodiment, referring to FIG. 4, only the first omnidirectional wheels 30 or the second omnidirectional wheels 50 are arranged along the third direction X. The first omnidirectional wheels 30 and the second omnidirectional wheels 50 are alternatively arranged along the second direction Y.

Figure 5:
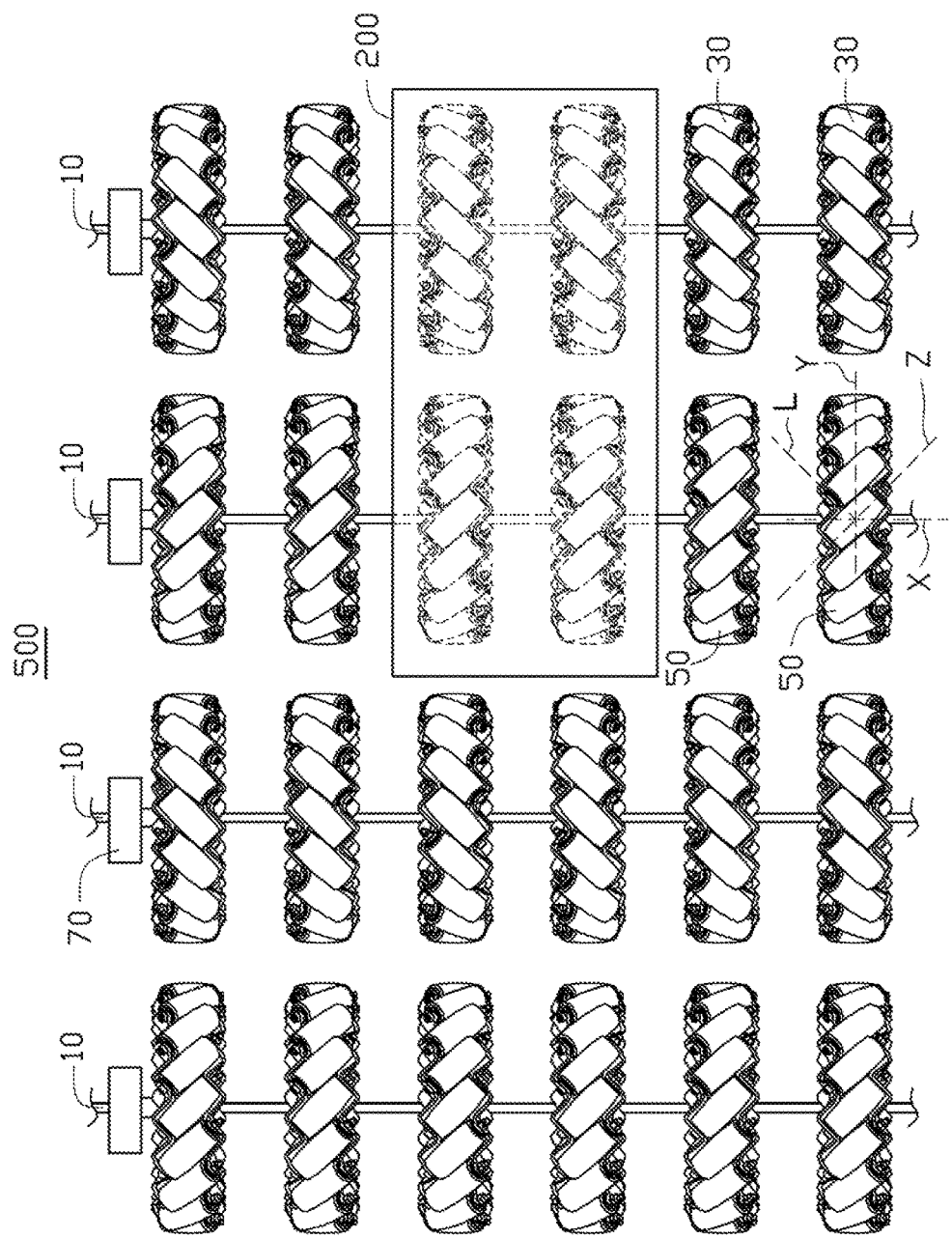
FIG. 5 is a diagram of a fourth exemplary embodiment of a shunting transmission device.

In a fourth exemplary embodiment, referring to FIG. 5, the first omnidirectional wheels 30 and the second omnidirectional wheels 50 are fixed on the rotating shafts 10. Only the first omnidirectional wheels 30 or the second omnidirectional wheels 50 are arranged along the third direction X. The first omnidirectional wheels 30 and the second omnidirectional wheels 50 are alternatively arranged along the second direction Y. In the fourth exemplary embodiment, a single actuator 70 is connected with one rotating shaft 10 to drive the rotating shaft 10 to rotate. So the first omnidirectional wheels 30 and the second omnidirectional wheels 50 are driven to rotate with the rotating shafts 10.

Figure 6:
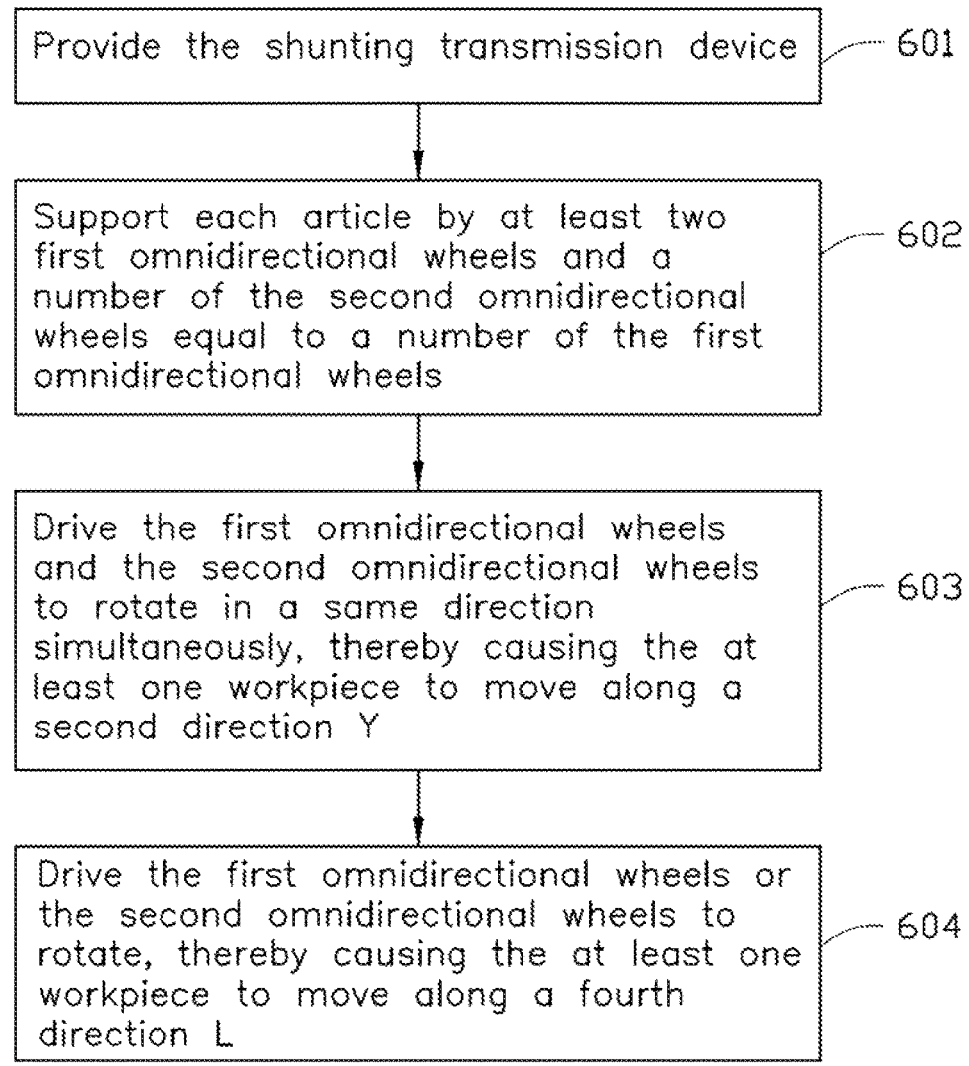
FIG. 6 is a flowchart of a first exemplary embodiment of a shunting transmission method.

FIG. 6 illustrates a flowchart of a shunting transmission method using the shunting transmission device 100 in FIG. 1 or the shunting transmission device 300 in FIG. 3 in accordance with a first exemplary embodiment. The first exemplary method is provided by way of example only, as there are a variety of ways to carry out the method. Each block shown in FIG. 6 represents one or more processes, methods or subroutines, carried out in the first exemplary method. Furthermore, the illustrated order of blocks is by example only and the order of the blocks can be changed. Additional blocks may be added or fewer blocks may be utilized, without departing from this disclosure. The first exemplary method can begin at block 601.

At block 601, referring to FIGS. 1 and 3, the shunting transmission device 100 or 300 (shown in FIG. 1 or FIG. 3) is provided.

At block 602, referring to FIG. 1, at least one workpiece 200 is putted on the shunting transmission device 100 or 300, and supported by at least two first omnidirectional wheels 30 and at least two second omnidirectional wheels 50. A number of the first omnidirectional wheels 30 for supporting the workpiece 200 is equal to a number of the second omnidirectional wheels 50 for supporting the workpiece 200.

At block 603, the first omnidirectional wheels 30 and the second omnidirectional wheels 50 are simultaneously driven to rotate in a same direction, thereby causing the at least one workpiece 200 to move along the second direction Y.

At block 604, the first omnidirectional wheels 30 or the second omnidirectional wheels 50 are driven to rotate, thereby causing the at least one workpiece 200 to move along a fourth direction L perpendicular to the connecting shaft 331 of the first driven roller 33 contacting the workpiece 200 or perpendicular to the connecting shaft 531 of the second driven roller 53 contacting the workpiece 200.

Figure 7:
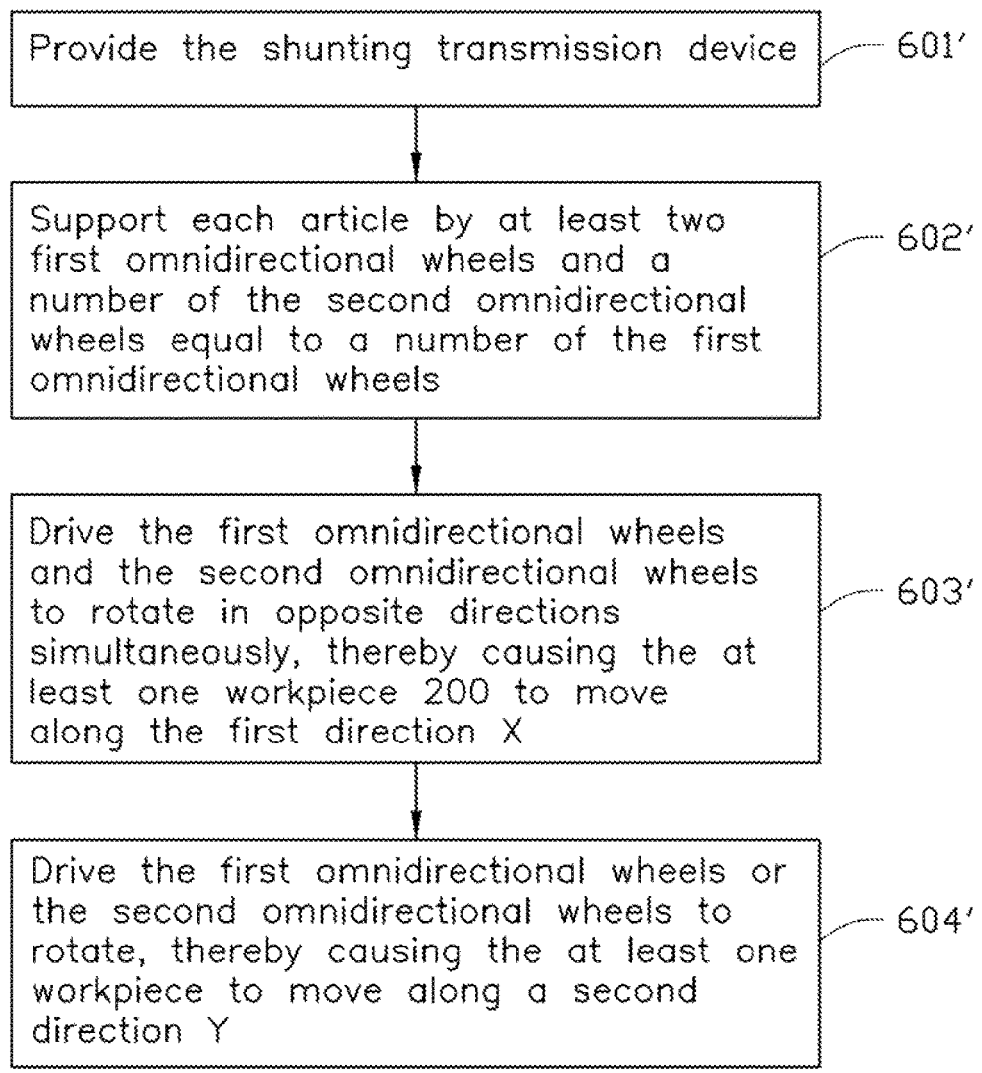
FIG. 7 is a flowchart of a second exemplary embodiment of a shunting transmission method.

FIG. 7 illustrates a second embodiment of a shunting transmission method using the shunting transmission device 400 in FIG. 4 or the shunting transmission device 500 in FIG. 5. Different from the above first embodiment, at block 603', the first omnidirectional wheels 30 and the second omnidirectional wheels 50 are simultaneously driven to rotate in opposite directions, thereby causing the at least one workpiece 200 to move along the first direction third direction X.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A shunting transmission device used to transport at least one workpiece, the shunting transmission device comprising:
   a plurality of rotating shafts parallel to one another and arranged in arrays;
   a plurality of first omnidirectional wheels each comprising a first hub and a plurality of first driven rollers installed on a periphery of the first hub to support the at least one workpiece, each of the plurality of first driven rollers having a center axis along a first direction; and
   a plurality of second omnidirectional wheels each comprising a second hub and a plurality of second driven rollers installed on a periphery of the second hub to support the at least one workpiece, each of the plurality of second driven rollers having a center axis along the first direction;
   wherein the plurality of first omnidirectional wheels and the plurality of second omnidirectional wheels are arranged in a matrix, and each wrapped around and rotatably connected to a corresponding one of the plurality of rotating shafts, the plurality of first omnidirectional wheels and the plurality of second omnidirectional wheels are alternatively arranged on each the plurality of rotating shafts, and the plurality of first omnidirectional wheels and the plurality of second omnidirectional wheels are also alternatively arranged along a second direction perpendicular to the plurality of rotating shafts; an angle between each the plurality of rotating shafts and the first direction is less than 90 degrees; the plurality of first driven rollers and the plurality of second driven rollers are mirror-symmetrical along at least one of a third direction parallel to the plurality of rotating shafts and the second direction.

2. The shunting transmission device of the claim 1, wherein each of the plurality of first driven rollers and the plurality of second driven rollers comprises a connecting shaft and a roller body wrapped around the connecting shaft, the connecting shaft is fixed on the first hub or the second hub, the roller body is used to support the at least one workpiece.

3. The shunting transmission device of the claim 2, wherein the first hub and the second hub each comprises a first support hub and a second support hub symmetrical with the first support hub along the corresponding one of the plurality of rotating shafts, a wavy fixing portion is formed along an outer circumference of each of the first support hub and the second support hub, the connecting shaft is fixed between the wavy fixing portion of the first support hub and the wavy fixing portion of the second support hub.

4. A shunting transmission method used to transport at least one workpiece, comprising:
   providing a shunting transmission device comprising:

a plurality of rotating shafts parallel to one another and arranged in arrays;

a plurality of first omnidirectional wheels each comprising a first hub and a plurality of first driven rollers installed on a periphery of the first hub to support the at least one workpiece, each of the plurality of first driven rollers having a center axis along a first direction; and a plurality of second omnidirectional wheels each comprising a second hub and a plurality of second driven rollers installed on a periphery of the second hub to support the at least one workpiece, each of the plurality of second driven rollers having a center axis along the first direction;

wherein the plurality of first omnidirectional wheels and the plurality of second omnidirectional wheels are arranged in a matrix, and each wrapped around and rotatably connected to a corresponding one of the plurality of rotating shafts, the plurality of first omnidirectional wheels and the plurality of second omnidirectional wheels are alternatively arranged on each the plurality of rotating shafts, and the plurality of first omnidirectional wheels and the plurality of second omnidirectional wheels are also alternatively arranged along a second direction perpendicular to the plurality of rotating shafts; an angle between each the plurality of rotating shafts and the first direction is less than 90 degrees; the plurality of first driven rollers and the plurality of second driven rollers are mirror-symmetrical along at least one of a third direction parallel to the plurality of rotating shafts and the second direction;

putting at least one workpiece on the shunting transmission device, each workpiece being supported by at least two of the plurality of first omnidirectional wheels and at least two of the plurality of second omnidirectional wheels, a number of the first omnidirectional wheels for supporting each workpiece equal to a number of the second omnidirectional wheels for supporting each workpiece;

driving the plurality of first omnidirectional wheels and the plurality of second omnidirectional wheels to rotate in a same direction simultaneously, to cause the at least one workpiece to move along the second direction or the third direction; and driving the plurality of first omnidirectional wheels or the plurality of second omnidirectional wheels to rotate, to cause at least one workpiece to move along a fourth direction perpendicular to the first direction of the first driven roller contacting the at least one workpiece or the first direction of the second driven roller contacting the at least one workpiece.

* * * * *